(12) United States Patent
Nakano (10) Patent No.: US 8,196,777 B2
(45) Date of Patent: Jun. 12, 2012

(54) CONNECTION MECHANISM BETWEEN A BEVERAGE CONTAINER AND A BEVERAGE DISPENSER AND A BEVERAGE DISPENSER USING THE SAME

(75) Inventor: Tomoharu Nakano, Hamura (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 497 days.

(21) Appl. No.: 12/527,056

(22) PCT Filed: Feb. 5, 2008

(86) PCT No.: PCT/JP2008/052220
§ 371 (c)(1),
(2), (4) Date: Aug. 13, 2009

(87) PCT Pub. No.: WO2008/099796
PCT Pub. Date: Aug. 21, 2008

(65) Prior Publication Data
US 2010/0018993 A1 Jan. 28, 2010

(30) Foreign Application Priority Data
Feb. 14, 2007 (JP) .................... 2007-033467

(51) Int. Cl.
*B67D 1/00* (2006.01)
(52) U.S. Cl. ....... 222/83; 222/81; 222/181.2; 222/185.1
(58) Field of Classification Search .................... 222/81, 222/83, 83.5, 86–88, 90, 541.2, 105, 181.1, 222/183, 181.2, 131, 129.1, 185.1; 285/24, 285/31
See application file for complete search history.

(56) References Cited

U.S. PATENT DOCUMENTS

| | | | | |
|---|---|---|---|---|
| 3,118,288 A | * | 1/1964 | Small | 62/292 |
| 4,257,535 A | * | 3/1981 | Mellett | 222/92 |
| 4,684,038 A | * | 8/1987 | Gaul et al. | 222/89 |

(Continued)

FOREIGN PATENT DOCUMENTS

EP 0 148 971 7/1985

(Continued)

OTHER PUBLICATIONS

International Search Report mailed Sep. 8, 2008 in International Application No. PCT/JP200/052220 filed Feb. 5, 2008.

*Primary Examiner* — Frederick C. Nicolas
(74) *Attorney, Agent, or Firm* — Drinker Biddle & Reath LLP (57) ABSTRACT

A connection mechanism between a beverage container and a beverage dispenser, the connection mechanism includes: a container mount having a notch configured for engagement with a beverage delivering port of a beverage delivering member arranged in a beverage container; a connection member having a cylindrical sharp tip portion at a top end thereof to be inserted into in the beverage delivering port and configured to be connected to a piping system; and an operating member serving for inserting the connection member into the beverage delivering port, wherein an end surface of the sharp tip portion opposing to the beverage delivering port defines a guide plane operable to guide the beverage delivering member to move in its allowable moving direction within the notch when the end surface is in contact with a perimeter edge of the beverage delivering port.

6 Claims, 11 Drawing Sheets

U.S. PATENT DOCUMENTS

| | | | |
|---|---|---|---|
| 5,732,853 A * | 3/1998 | Ganzeboom et al. | 222/82 |
| 6,095,433 A * | 8/2000 | Langdon | 239/272 |
| 6,207,046 B1 | 3/2001 | Yamashita et al. | |
| 6,223,940 B1 * | 5/2001 | Quinn | 222/81 |
| 6,976,606 B2 * | 12/2005 | Anderson | 222/83 |

FOREIGN PATENT DOCUMENTS

| | | |
|---|---|---|
| JP | 9-240789 | 9/1997 |
| JP | 11-190577 | 7/1999 |
| JP | 2006-27661 | 2/2006 |
| WO | 2005/040034 | 5/2005 |

* cited by examiner

CONNECTION MECHANISM BETWEEN A BEVERAGE CONTAINER AND A BEVERAGE DISPENSER AND A BEVERAGE DISPENSER USING THE SAME

CROSS REFERENCE TO RELATED APPLICATIONS

This application is the National Stage of International Application No. PCT/JP2008/052220, filed Feb. 5, 2008, and claims benefit of Japanese Application No. 2007-033467, filed Feb. 14, 2007, both of which are herein incorporated by reference in their entirety.

FIELD OF THE INVENTION

The present invention relates to a connection mechanism between a beverage container and a beverage dispenser and a beverage dispenser using the same mechanism, and more specifically, to a connection mechanism for providing an interconnection between a replaceable beverage container and a beverage dispenser for delivering a beverage from the beverage container and a beverage dispenser using the same mechanism.

DESCRIPTION OF THE RELATED ART

There are various types of connection mechanism and beverage dispenser using such a mechanism that have been suggested in related arts. Among others, in one common type of the connection mechanism according to the related arts, the beverage container, such as a flexible bag, is filled with a beverage, and the connection mechanism is used to establish an interconnection between a beverage delivering port of the beverage container and a piping system of the beverage dispenser so as to allow the beverage to be taken out from the beverage delivering port (see Patent Document 1).

Figure 11:
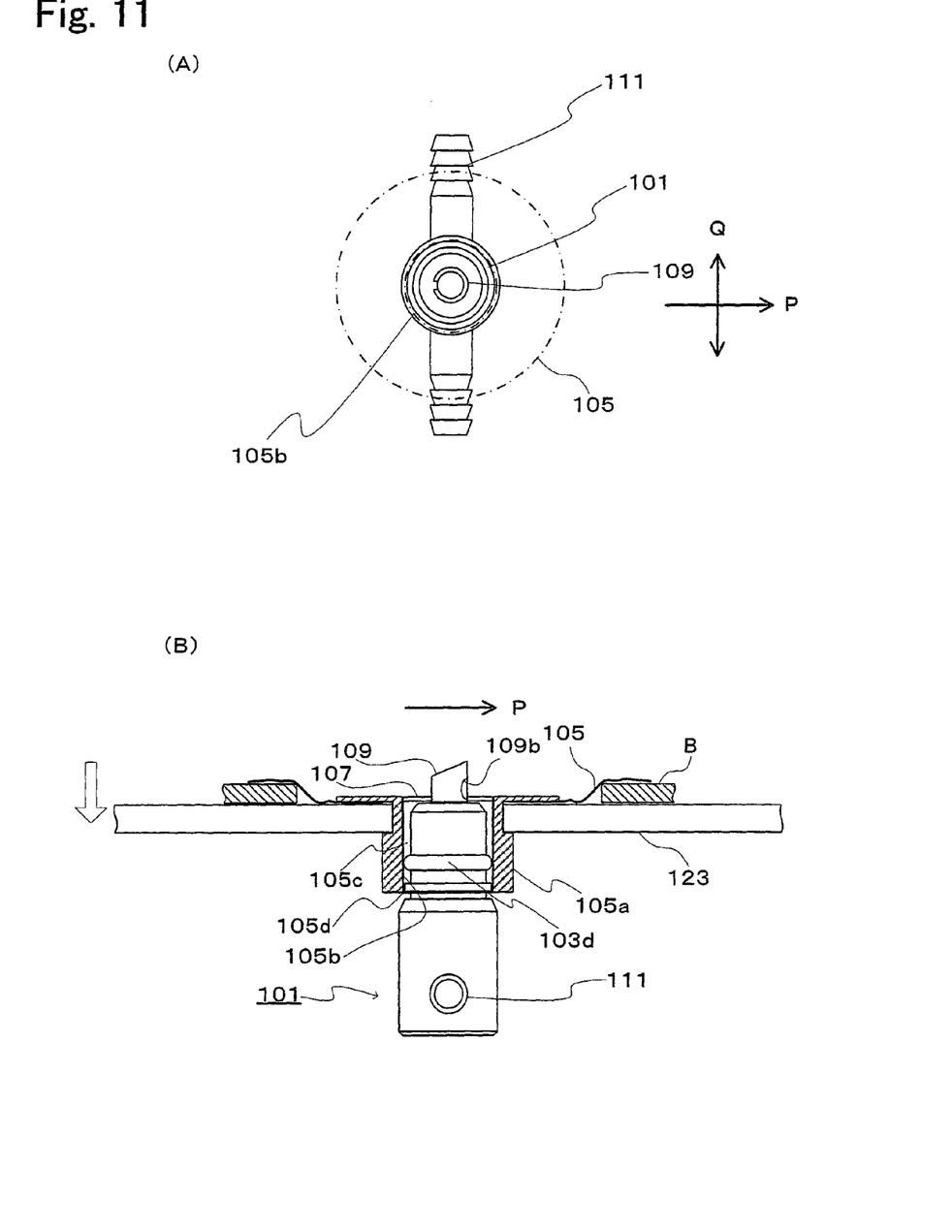

To describe specifically, as illustrated in FIG. 11, a beverage container 105 is placed on a container mount 123, which is adapted to be positioned between a tilted state and a horizontal state. FIG. 11 depicts the container mount 123 positioned horizontally. If the beverage container 105 is properly positioned as described above, as the container mount 123 is positioned in the horizontal state, a sharp tip portion 109 of a connection member 101 is allowed to be inserted into a beverage delivering port 105c of a beverage delivering member 105a. This permits the sharp tip portion 109 to penetrate through a sealing cover 107 and into the inside of the beverage container 105. The beverage within the beverage container 105 can flow from the sharp tip portion 109 into the connection member 101 and further through an internal channel to a discharge pipe 111, which makes branched flows of the beverage. Since the beverage container 105 is placed in a top portion of the beverage dispenser, the beverage can be taken to the outside owing to the gravity. Here, there is a predetermined gap between an inner wall 105b of the beverage delivering port 105c and a connection member 101. However, an O-ring 103d located on an outer circumferential surface of the connection member 101 ensures that any leakage of the beverage from the beverage delivering port 105c can be prevented. In this example, the container mount 123 capable of tilting and the connection member 101 together can constitute the connection mechanism.

Figure 12:
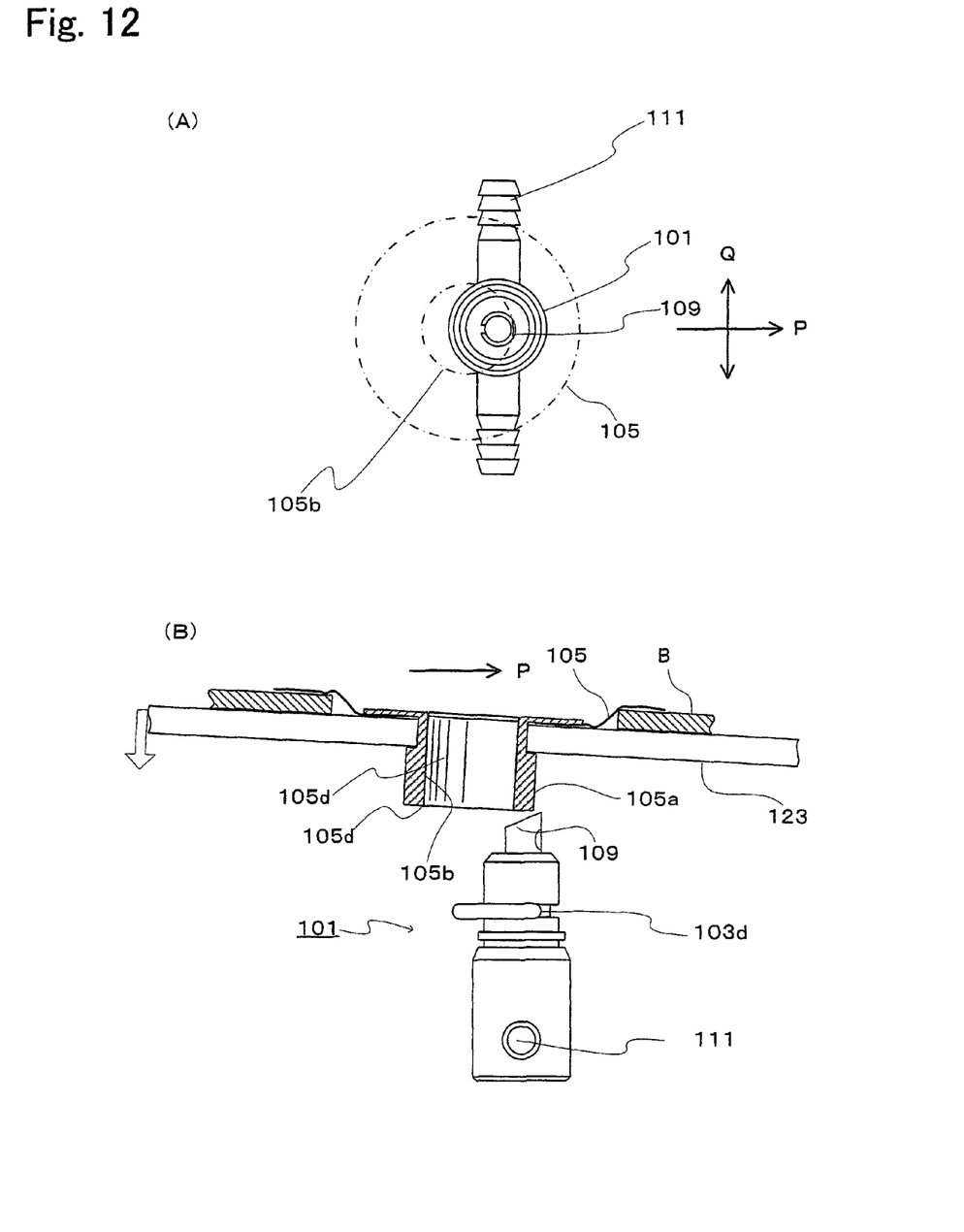

In contrast, FIG. 12 illustrates a situation where the beverage container 105 is improperly positioned. Specifically, the relative position of the beverage delivering member 105a to the connecting member 101 is inconsistent, with a tip end of the connection member 101 being only in slight contact with a perimeter edge of the beverage delivering port 105c. Even in such a condition, owing to the beverage delivering member 105a made of resin material, such as polyethylene, the horizontal state can be still achieved by pushing the beverage container 105 downward.

[Patent Document 1]
Japanese Patent Laid-open Publication No. 2006-27661 (see specifically FIG. 7)

SUMMARY OF THE INVENTION

However, disadvantageously, the pushing down of the beverage container 105 under the condition of the connection member 101 being dislocated relative to the beverage delivering member 105a could lead to the following. Specifically, the connection member 101 is made of metal, whereas the beverage delivering member 105a is made of resin material, such as polyethylene, as described above, and so the inner wall 105b of the beverage delivering port 105c could be damaged when the beverage container 105 is pushed down. The inner wall of the beverage delivering port 105c, once damaged, could lead to the leakage of the beverage that could leak from the damaged site in spite of the arrangement of the O-ring 103.

An object of the present invention is to provide a connection mechanism that can solve the problem as pointed above and another object thereof is to provide a beverage dispenser using the same connection mechanism.

To accomplish the above objects, an aspect of the present invention provides a connection mechanism between a beverage container and a beverage dispenser, the connection mechanism employing a configuration to include: a container mount having a notch configured for engagement with a beverage delivering port of a beverage delivering member arranged in a beverage container; a connection member having a cylindrical sharp tip portion at a tip end thereof to be inserted into the beverage delivering port and configured to be connected to a piping system; and an operating member serving for inserting the connection member into the beverage delivering port, wherein an end surface of the sharp tip portion opposing to the beverage delivering port defines a guide plane operable to guide the beverage delivering member to move in its allowable moving direction within the notch when the end surface is in contact with a perimeter edge of the beverage delivering port. By virtue of such a configuration employed, the sharp tip portion can provide the guide plane relative to the beverage delivering member. This helps, even if a tip end of the sharp tip portion comes in contact with the perimeter edge of the beverage delivering port, the perimeter edge of the beverage delivering port be moved in its allowable moving direction within the notch with the aid of an operation of the guide plane. Consequently, a relative position between the beverage delivering member and the connection member is corrected, and so possibility of inadvertent damages onto the inner wall of the beverage delivering port can be reduced.

The aspect of the present invention preferably employs a configuration, in which the guide plane provides an inclined surface relative to the beverage delivering port. By virtue of such a configuration employed, a similar effect can be achieved by the inclined surface serving as the guide plane that comes into contact with the perimeter edge of the beverage delivering port. Further, the similar effect can be also achieved by arranging the connection member relative to the beverage dispenser with its front side and back side positioned inversely.

The aspect of the present invention preferably employs a configuration, in which a slit is formed in a sidewall of the sharp tip portion. When the sharp tip portion penetrates through a sealing cover of the beverage container, owing to the slit formed in the sidewall of the sharp tip portion, the portion of the sealing cover corresponding to the slit would not be cut, which portion is held in the beverage container as it is still connected with the rest of the sealing cover.

The aspect of the present invention preferably employs a configuration, in which a through-hole is formed in a sidewall of the sharp tip portion. Owing to the through-hole formed in the sidewall of the sharp tip portion, the beverage can be successfully delivered via the through-hole, even when the level of the beverage inside the beverage container has decreased below the tip end of the sharp tip portion. Thus, the beverage can be fully taken out.

The aspect of the present invention preferably employs a configuration, in which the connection member comprises an insert segment having the sharp tip portion carried thereon and configured to be inserted into the beverage delivering port, wherein a guide section is formed in an end portion of the insert segment adjacent to the beverage delivering port side, the guide section operable to guide the beverage delivering member to move in its allowable moving direction within the notch when the end portion is in contact with a perimeter edge of the beverage delivering port. With the aid of such a configuration employed, when the connection member is inserted into the beverage delivering port, the guide section comes into contact with the perimeter edge of the beverage delivering port and helps the beverage delivering member to move to a proper position relative to the connection member. Consequently, a slight dislocation of the beverage delivering member relative to the connection member can be corrected.

The aspect of the present invention further employs a configuration, wherein a beverage dispenser comprises the connection mechanism in accordance with any one of the types as described above. With the aid of such a configuration as employed, the failures, such as damage onto the inner wall of the beverage delivering port and the like, upon replacement of the beverage container into the beverage dispenser can be prevented.

According to the aspect of the present invention, even if the relative position between the beverage delivering member and the connection member is inconsistent to each other, this inconsistent relative position between the beverage delivering member and the connection member can be still corrected, and so the possible damage onto the inner wall of the beverage delivering port can be prevented.

BRIEF DESCRIPTION OF THE DRAWINGS

FIG. 1 depicts a connection member used in a first embodiment of the present invention, wherein FIG. 1(A) shows a plan view, FIG. 1(B) shows a front view and FIG. 1(C) shows a right side elevational view, respectively, of the connection member;

FIG. 3 depicts a connection mechanism applied with the connection member as disclosed in FIG. 1, wherein FIG. 3(A) shows a plan view with a beverage delivering port represented by an imaginary line, FIG. 3(B) shows a front view and FIG. 3(C) shows a front view with a beverage delivering port presented in a sectional view, respectively, of the connection mechanism;

FIG. 4 illustrates a condition of a beverage container being dislocated relative to the connection member as disclosed in FIG. 1, wherein FIG. 4(A) shows a plan view and FIG. 4(B) shows a right side elevational view with a beverage delivering port exclusively presented in a sectional view, respectively, of the connection mechanism;

FIG. 5 illustrate a condition of a beverage container being further dislocated than in the condition as disclosed in FIG. 4, wherein FIG. 5(A) shows a plan view and FIG. 5(B) shows a right side elevational view with a beverage delivering port exclusively presented in a sectional view, respectively, of the connection mechanism;

FIG. 6 is a schematic view for illustrating an operating member constituting the connection mechanism, wherein FIG. 6(A) is a plan view and FIG. 6(B) is a right side elevational view with a beverage delivering port exclusively presented in a sectional view, respectively, of the operating member;

FIG. 7 represents a connection member used in a second embodiment of the present invention, wherein FIG. 7(A) is a plan view, FIG. 7(B) is a front view and FIG. 7(C) is a right side elevational view, respectively, of the connection member;

FIG. 8 represents a connection member used in a third embodiment of the present invention, wherein FIG. 8(A) is a plan view, FIG. 8(B) is a front view and FIG. 8(C) is a right side elevational view, respectively, of the connection member;

FIG. 11 illustrates a condition of a connection mechanism of the prior art with a connection member of the connection mechanism and a beverage delivering port of a beverage container in a proper physical relationship to each other, wherein FIG. 11(A) shows a plan view and FIG. 11(B) shows a right side elevational view with the beverage delivering port exclusively presented in a sectional view, respectively, of the connection mechanism; and FIG. 12 illustrates a condition of the beverage container being dislocated relative to a connection member as disclosed in FIG. 11, wherein FIG. 12(A) is a plan view and FIG. 12(B) is a right side elevational view with the beverage delivering port exclusively presented in a sectional view, respectively, of the connection mechanism.

DESCRIPTION OF THE PREFERRED EMBODIMENTS

One embodiment of the present invention will now be described with reference to the attached drawings.

[Connection Mechanism]

A connection mechanism S (see FIGS. 2 to 6) of the present invention comprises a container mount 23 capable of supporting a beverage container 5 within a beverage dispenser D and having a notch 25 configured for engagement with a beverage delivering member 5a arranged in the beverage container 5, a connection member 1 having a cylindrical sharp tip portion 9 at a tip end thereof to be inserted into a beverage delivering port 5d of the beverage delivering member 5a and configured to be connected to a piping system 2a, 2b disposed in the downstream side, and an operating member 29 serving for inserting the connection member 1 into the beverage delivering port 5d.

[Container Mount]

The container mount 23 is located inside the beverage dispenser D and configured to support the beverage container 5. More specifically, the container mount 23 lies horizontally inside the beverage dispenser D, on which the beverage container 5 can be placed. The container mount 23 has a notch 25 formed in a central region in the left-right direction as viewed from the front side (see FIG. 3), into which a narrowed portion 5c defined in an outer circumferential surface of the beverage delivering member 5a of the beverage container 5 is pushed. Once the narrowed portion 5c of the beverage delivering member 5a has been pushed into the notch 25, the movement of the beverage delivering member 5a along the left-right direction Q orthogonal to the push-in direction P as well as along the up-down direction is restricted. In other words, in the illustrated embodiment, the direction along the push-in direction P defines the allowable moving direction for the beverage delivering member 5a.

[Connection Member]

As shown in FIGS. 1 to 5, the connection member 1 of the present invention comprises a connection member body 3 having a channel formed internally for a flow of a beverage, a sharp tip portion 9 arranged in an upper end of the connection member body 3 for penetrating a sealing cover 7 of the beverage container 5 and a discharge pipe 11 coupled to a lower end of the connection member body 3 to distribute the branched flow of the beverage in two directions for discharging. In this connection, FIG. 1(B) shows a front view of the connection member 1, and the connection member 1 would be oriented as shown in FIG. 1(B) when the beverage dispenser D, which will be described late, is viewed from the front (see FIG. 2).

Figure 1:
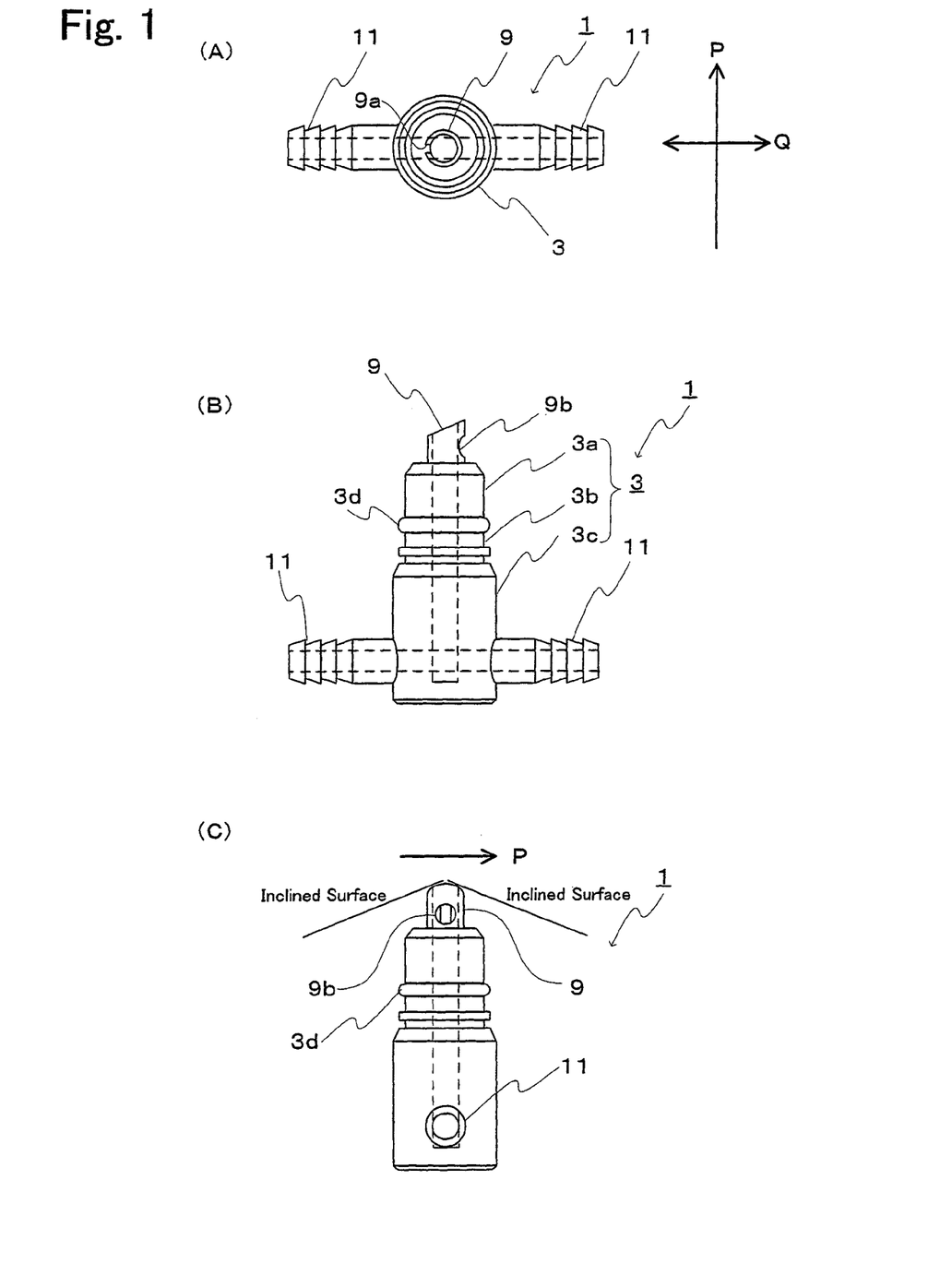

The connection member body 3 is composed of an insert segment 3a having the sharp tip portion 9 carried thereon, a branched segment 3c for providing branched channels for an internal flow and a coupling segment 3b for coupling between the insert segment 3a and a branched segment 3c. The insert segment 3a is configured to have a predetermined diameter sufficient to be inserted into the beverage delivering port 5d of the beverage container 5. In addition, an O-ring 3d made of elastic material (e.g., rubber) and the like is disposed on an outer circumferential surface of the coupling segment 3b. The O-ring 3d provides a sealing for a tubular member 5b of the beverage delivering port 5d so as to prevent the beverage from being leaked to the outside. The branched segment 3c includes a branched channel formed internally, more specifically, an internal channel extending longitudinally from the sharp tip portion 9 side, along the longitudinal direction with respect to the connection member body 3 and also a discharge channel formed in the direction orthogonal to the internal channel. In other words, it defines a T-shaped channel. It is to be noted that the present invention is not limited to the bi-directional branched flow but may have a structure allowing for the branched flows in three or more channels.

The sharp tip portion 9 of the connection member 1 is made in a substantially cylindrical configuration with an end surface (facing to the beverage container 5) providing a guide plane. Specifically, the guide plane serves to cause the beverage delivering member 5a to move along its allowable moving direction within the notch 25 when the end surface of the sharp tip portion 9 is in contact with the perimeter edge 5e of the beverage delivering port 5d, said guide plane actually assuming an inclined surface. The sharp tip portion 9 of the illustrated embodiment assumes the inclined surface rising toward the right-hand side elevational viewed from the front, as shown in FIG. 1(B). Consequently, as seen in FIG. 1(C), which is the right side elevational view, the sharp tip portion 9 has the inclined surface defined by two sides inclined downward from a center a longest part (the part most proximal to the beverage delivering port 5a) toward the left and the right. The sharp tip portion 9 further includes a predetermined slit 9a formed in a shortest part (in the left sidewall side). The slit 9a is provided to produce a specific portion to remain uncut so as to prevent the portion of the sealing cover 7 of the beverage container 5 at the site of the penetration by the sharp tip portion 9 from dropping off.

The sharp tip portion 9 further include a predetermined through-hole 9b formed in the right sidewall side. The through-hole 9b is provided to allow the beverage inside the beverage container 5 to be delivered therethrough upon insertion of the sharp tip portion 9 into the beverage container 5. To do this, the through-hole 9b is arranged at such a location that the entire through-hole 9b can be positioned inside the beverage container 5, when the sharp tip portion 9 breaks into the beverage container 5. It is to be noted that although the only one through-hole 9b is formed in the illustrated embodiment, the present invention is not limited to that but two or more through-holes may be provided. Further, the shape of the through-hole 9 is not limited to a simple circular shape, but any shapes may be used.

Two discharge pipes 11 joined to the connection member body 3 are disposed at a lower end portion of the branched segment 3c and protruding toward the opposite sides to each other. The discharge pipe 11 includes an anti-slip out feature in a surface thereof so as to prevent the piping system 2a, 2b connected to the discharge pipe 11 from slipping out of the pipe.

The connection member 1 as designated above may be formed of stainless steel. Specifically, the connection member body 3 and the sharp tip portion 9 may be formed by machining a cylindrical rod of stainless steel. Then, a channel is formed inside the connection member body 3. Subsequently, the discharge pipe 11 is joined to the branched segment of the connection member body 3 by welding. It is to be noted that the material of the connection member 1 of the present invention is not limited to the stainless steel but any suitable metal or non-metal material may be used so long as it is stable to beverages and would not induce a change in property, such as corrosion.

[Operating Member]

Figure 6:
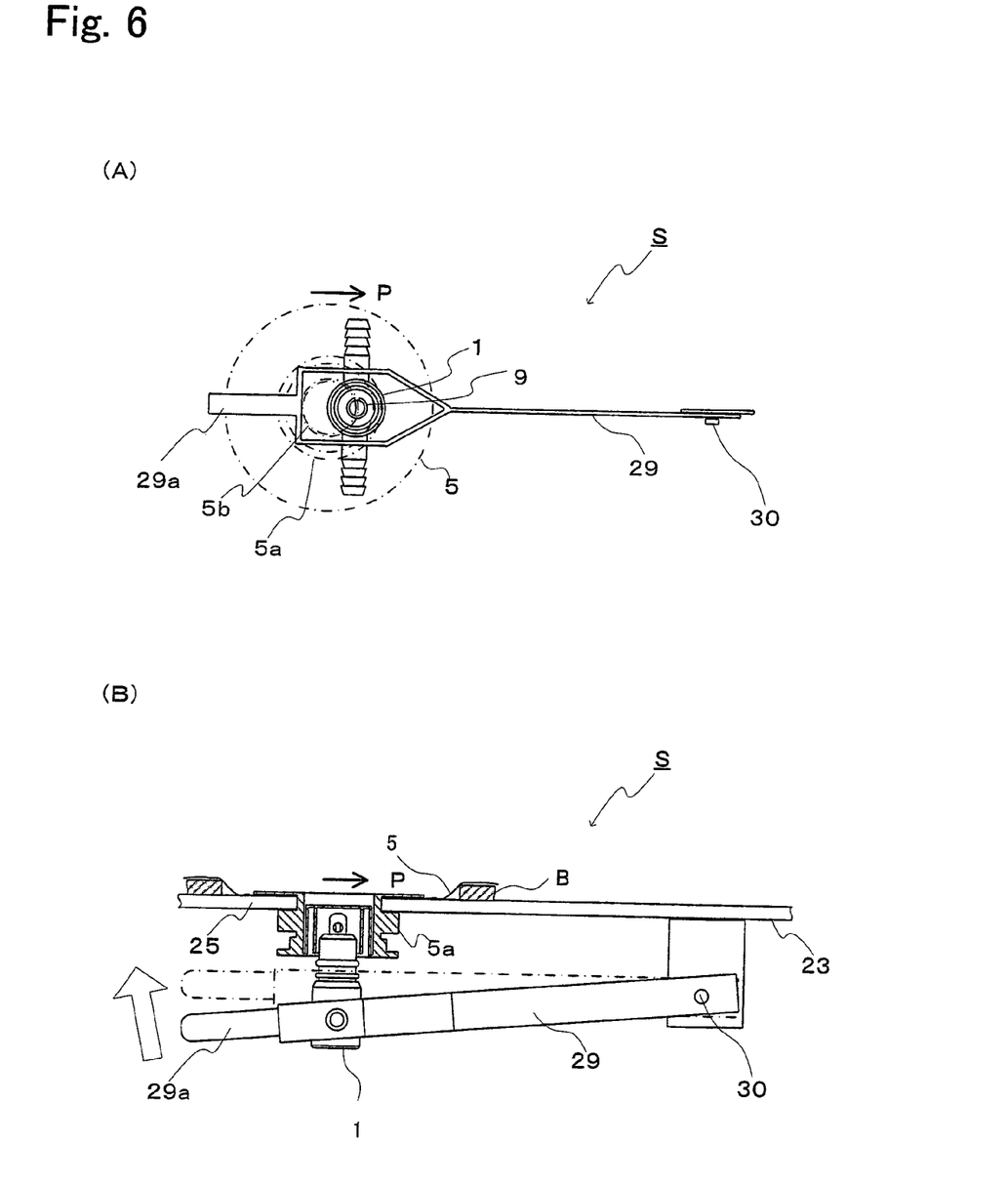

The operating member 29 comprises a lever member configured for engagement with the connection member 1 and placed along the push-in direction P for the beverage container 5. To explain this in more detail, the operating member 29 is arranged so as to support the connection member 1 from the left and the right sides and to pivotally rotate in the up-down direction around a shaft 30 as a center. In addition, a gripping portion 29a is disposed at an end of the operating member 29 in near side for a user to manipulate the gripping portion 29a. With such a configuration as designated above, to connect the beverage delivering member 5a of the beverage container 5 with the beverage dispenser D, the beverage container 5 is mounted on the container mount 23 and the beverage delivering member 5a is placed into the notch 25. Then, the user holds and moves the gripping portion 29a of the operating member 29 upward with his/her fingers. This in turn moves the sharp tip portion 9 of the connection member 1 upward and into the beverage delivering port 5d. On the other hand, to disengage the beverage container 5 from the beverage dispenser, the gripping portion 29a of the operating member 29 is held and moved inversely downward.

It is to be noted that although the above embodiment is directed to the case where the connection member 1 should be pushed up for insertion into the beverage delivering port 5d, the present invention is not limited to that. Specifically, the present invention is also applicable to such a structure as depicted in FIGS. 11 and 12, in which a fixed connection member 101 can be inserted into a beverage delivering port 105c by rotationally moving the container mount 123 from a tilted state to a horizontal state. Specifically, the container mount 123 is rotated and pushed down to thereby make a contact between a perimeter edge 105d of the beverage delivering port 105c and a sharp tip portion 109. With the aid of the sharp tip portion 109 serving as the guide plane as described in the above embodiment, the beverage delivering member 105a can be moved properly.

[Beverage Dispenser]

Figure 2:
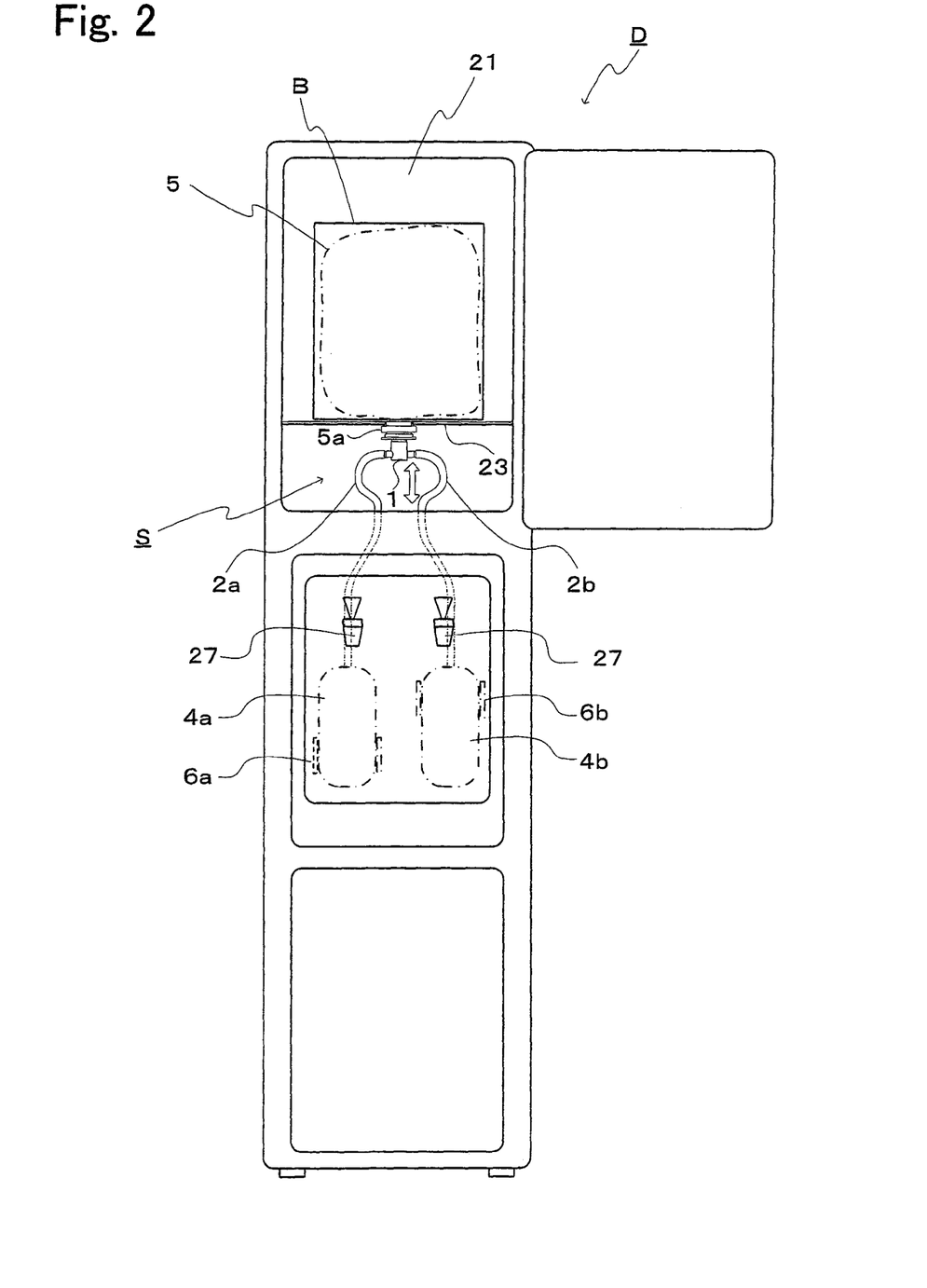
FIG. 2 is a front view showing a beverage dispenser equipped with the connection member as disclosed in FIG. 1.

The description is now directed to the beverage dispenser D equipped with the connection mechanism S as described above. As schematically shown in FIG. 2, the beverage dispenser D comprises a cooling chamber 21 in an upper region thereof, and the cooling chamber 21 is adapted to accommodate the beverage container 5 inside thereof. More specifically, the container mount 23 as mentioned above lies horizontally below the cooling chamber 21, on which the beverage container 5 can be mounted. The container mount 23 includes the predetermined notch 25 formed in the central region as viewed from the front (see FIG. 3), into which the narrowed portion 5c defined in the outer circumferential surface of the beverage delivering member 5a of the beverage container 5 can be pushed. Once the narrowed portion 5c of the beverage delivering member 5a has been pushed into the notch 25, the movement along the left-right direction Q orthogonal to the push-in direction P as well as the up-down direction is restricted. It is to be noted that the cooling chamber 21 is not necessarily essential to the present invention but a container storage chamber at a room temperature may be used. Further, the beverage container 5 in itself may be placed in an environment directly exposed to an outside air based on the premise that there is no chance for various kinds of germs to be included in the beverage as far as the sufficient level of hygiene is secured in a peripheral area around the connection mechanism S, especially in the connection member 1 and the beverage delivering member 5a.

In the beverage dispenser D, the beverage container 5 is a sealed container of a bag-in-box type container, and the beverage delivering member 5a provided in coupling with an inner bag of the beverage container 5 is connected with respective piping systems 2a and 2b (see FIGS. 2 and 3) provided in the beverage dispenser D side via the connection member 1. In this regard, the bag-in-box type container is referred to a container constructed with an outer box B made of cardboard or the like and a flexible bag disposed inside the outer box B. Since the beverage delivering member 5a is attached to the flexible bag, in the circumstance where the outer box B in itself is immobilized, the beverage delivering member 5a is still allowed to make some movement, if applied with an external force. In addition, the sealing cover 7 as mentioned above is disposed in the beverage delivering port 5d at the innermost region thereof so as to secure the germ-free condition for the beverage that has been contained in the container as being free from germs.

The beverage container 5 inside the beverage dispenser D can be cooled to about 4-10° C. in the cooling chamber 21. This is for the purpose of keeping the beverage at a lower temperature suitable for serving for drinking as well as for storing the beverage at such a lower temperature that makes it difficult for the germs to reproduce themselves in order to reduce the possibility of contamination of the beverage in the beverage container 5. Further, the connection member 1 provided in the site of connection between the beverage container 5 and the beverage dispenser D is also situated in the cooling chamber 21 under the condition where the outside air is blocked, yet in the lower temperature atmosphere, making it difficult for the germs to invade and reproduce themselves therein.

Figure 3:
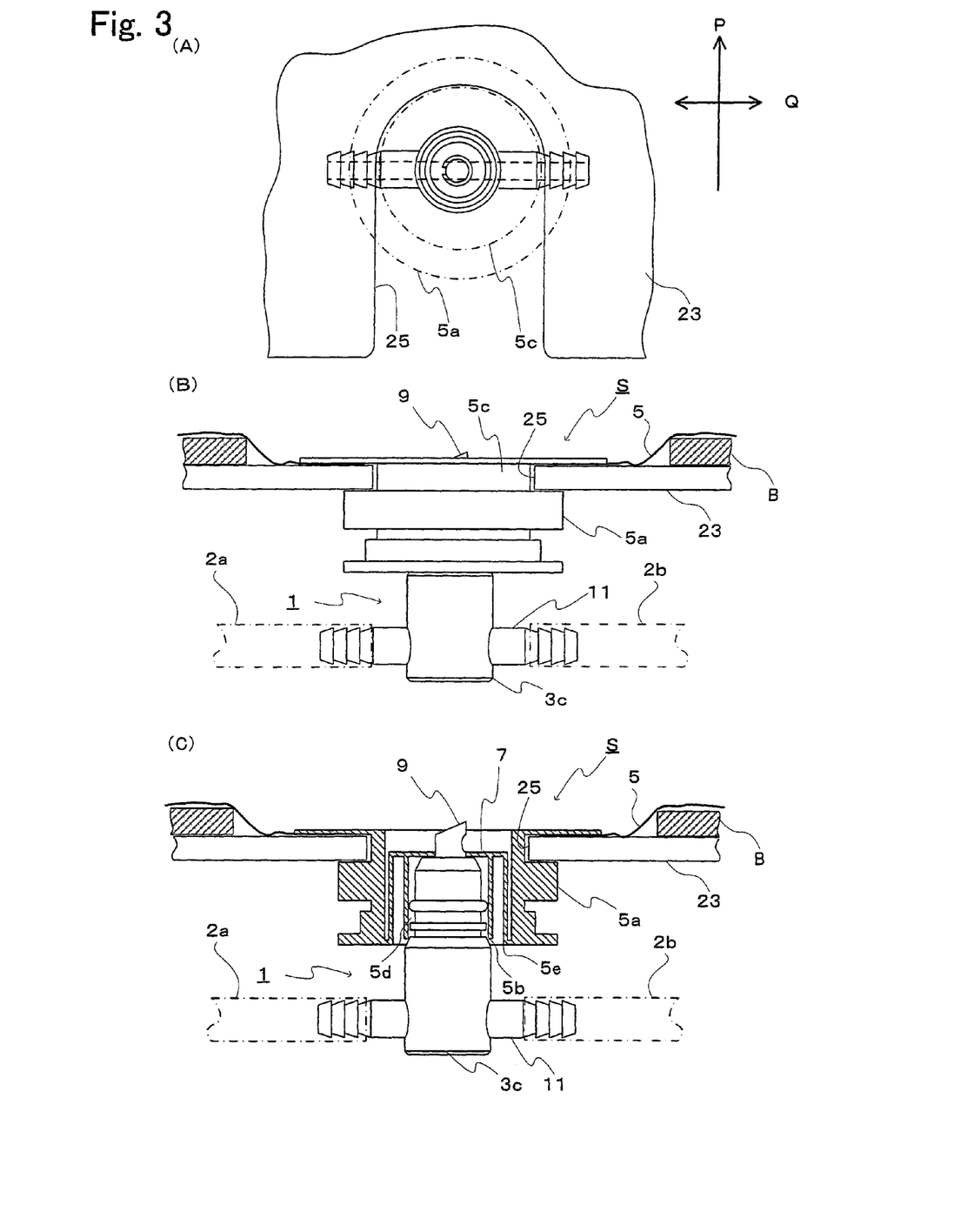

The beverage delivering port 5d of the beverage container 5 is fitted with the inserted connection member 1. More specifically, as shown in FIG. 3, the tubular member 5b having a bore sized correspondingly to that of the O-ring 3d of the connection member 1 is internally disposed in the beverage delivering member 5a. Owing to such a configuration, when the sharp tip portion 9 of the connection member 1 penetrates through the sealing cover 7 of the beverage container 5, the O-ring 3d is operable associatively with the tubular member 5b to prevent the leakage of the beverage. In addition, to replace a beverage container 5 with another, the operating member 29 is pushed downward to allow the connection member 1 to be removed from the beverage delivering port 5d, and then the beverage container 5 is drawn from the front side toward this side so as to remove the presently empty beverage container 5 out of the notch 25. Subsequently, a new beverage container 5 is pushed horizontally from the front side toward the inside (in the push-in direction P) to thereby position the beverage delivering member 5a into the notch 25. Thereafter, the operating member 29 is pushed upward to insert the connection member 1 into the beverage delivering port 5d, so that the sealing cover 7 can be penetrated for delivering the beverage (see FIG. 3).

Referring further to FIG. 2, a dispensing port 27 is disposed in a middle level of the beverage dispenser D, which is provided for dispensing the beverage. The beverage dispenser D in the illustrated embodiment has two dispensing ports 27. The dispensing port 27 is connected with the piping system 2a, 2b via the connection member 1 as described above so as to supply the beverage contained in the beverage container 5. Since the dispensing ports 27 of the illustrated embodiment are adapted to serve a cold and a hot water, respectively, there are a heating tank 4a and a cooling tank 4b provided therein for storing the beverage temporarily. The heating tank 4a is adapted to be supplied with the beverage via the piping system 2a, while the cooling tank 4b is adapted to be supplied with the beverage via the piping system 2b. Furthermore, a heating device 6a is disposed in a surface of the heating tank 4a for heating the beverage, while a cooling device 6b is disposed in a surface of the cooling tank 4b for cooling the beverage.

[Operation]

Figure 4:
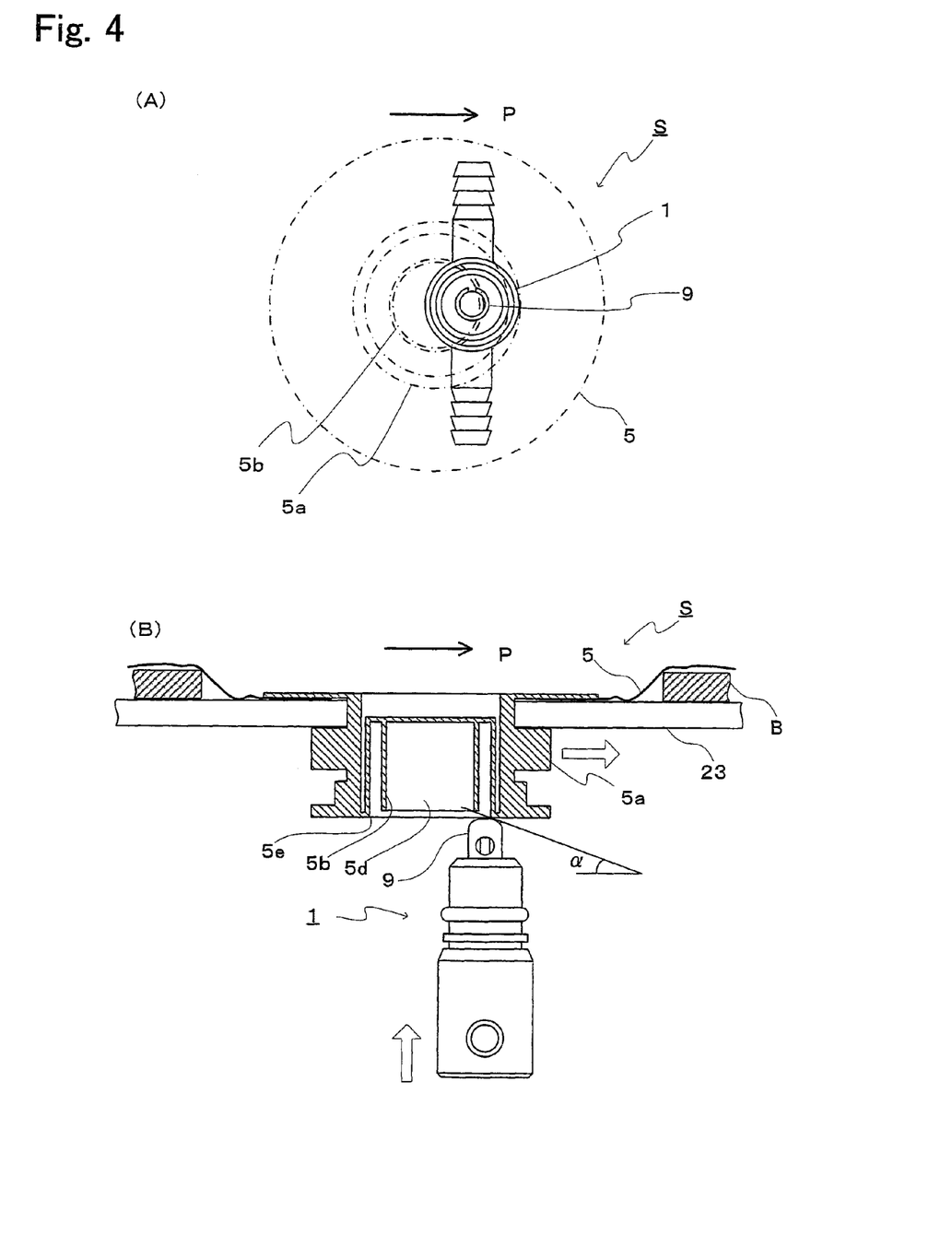

With reference to FIG. 4, an operation of the connection mechanism S according to the present invention will now be described. In this regard, FIG. 4(A) is a plan view of the connection member 1 along with the beverage delivering member 5a viewed from the top, and FIG. 4(B) is a side elevational view thereof. It is to be noted that for convenience of the description, the beverage delivering member 5a is represented by a dashed line in FIG. 4(A), and the beverage delivering member 5a is exclusively presented in a sectional view in FIG. 4(B). It is further noted that in the illustration the left-hand side represents the front side, wherein the beverage delivering member 5a, during the beverage container 5 being pushed into the beverage dispenser D, would move from the left to the right (in the push-in direction P).

In FIG. 4, the beverage delivering member 5a is offset toward the left relative to the connection member 1. In other words, this indicates a condition where the push-in amount of the beverage container into the beverage dispenser D is insufficient. The allowable moving direction for the beverage delivering member 5a in the above-discussed condition is either along the notch 25, the direction P, or the direction opposite thereto. In the normal operation, the center of the beverage delivering port 5d must be substantially aligned with the center of the sharp tip portion 9, but in FIG. 4, due to the insufficient push-in amount, the perimeter of the beverage delivering port 5d is in contact with the tip end of the sharp tip portion 9. Such a condition could occur, during insertion of the beverage delivering member 5a into the notch 25 formed in the container mount 23 of the cooling chamber 21, if the beverage delivering member 5a is jammed and stopped in the notch 25, giving a user a wrong idea that he/she has successfully pushed the beverage container 5 to the innermost region.

In that condition, the user could attempt to lift up the connection member 1 with the operating member 29 in order to insert the connection member 1 into the beverage delivering port 5d. During this attempt, although the sharp tip portion 9 would come into contact with the perimeter edge 5e of the beverage delivering port 5d, as shown in FIG. 4(B), the site of contact of the sharp tip portion 9 defines a guide plane (an inclined surface) declining toward the right at a predetermined angle α, which could produce a component of force applied onto the beverage delivering member 5a toward the right (in the push-in direction P for the beverage container 5) to cause the beverage delivering member 5a to move properly. Specifically, the positioning of the beverage delivering member 5a can be corrected so that a proper positional relationship between the beverage delivering member 5a and the connection member 1 can be established. Consequently, according to the present invention, there would be no chance to make damage onto the inner wall of the beverage delivering port 5d, as compared to the conventional connection member having no inclined surface toward the push-in direction for the beverage container 5.

Figure 5:
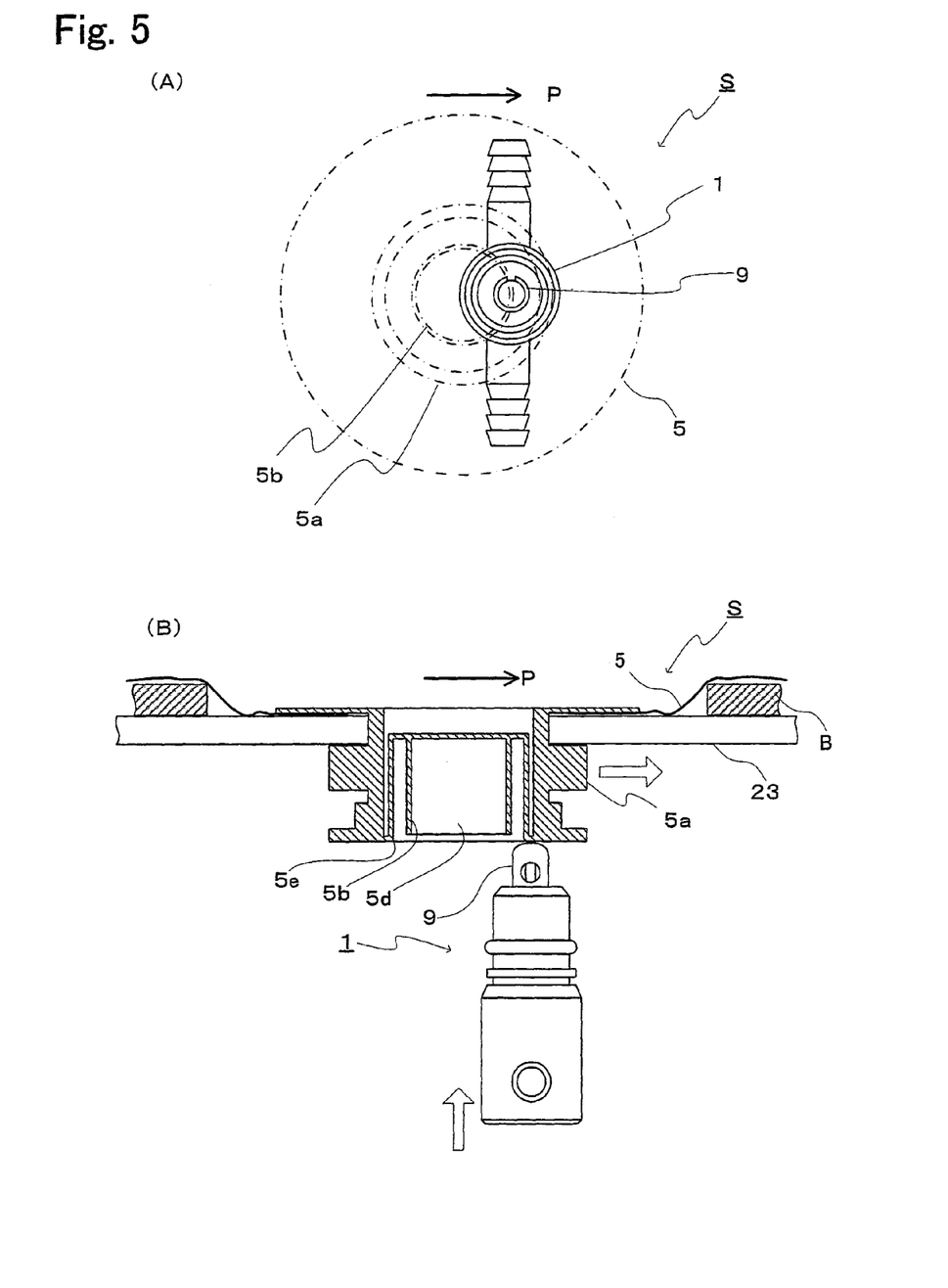

It is to be noted that the discussion above is applied to the case where the perimeter edge of the beverage delivering port 5d has been offset to the right-hand side relative to the longest part (the part most proximal to the beverage container) of the sharp tip portion 9. However, in the actual mode of practice, there may be a case where the perimeter edge 5e of the beverage delivering port 5d has been offset to the left-hand side relative to the longest part of the sharp tip portion 9, as shown in FIG. 5. In that condition, the tip end of the sharp tip portion 9 is in abutment with a lower surface of the beverage delivering member 5a to block the further lift-up of the connection member 1. This would make the user realize that the positioning of the beverage container 5 is improper or that there must be some failure existing. Consequently, the chance of any damage that could be given to the inner wall of the tubular member 5b within the beverage delivering port 5d can be avoided.

As explained above, according to the present invention, what is required is that the tip end of the sharp tip portion 9 of the connection member 1 simply provide such a guide plane that is sloping more or less along the push-in direction P for the beverage container 5 (the allowable moving direction within the notch 25). Owing to the guide plane, the beverage delivering member 5a can be guided, as it follows the rise of the connection member 1 into the proper position or the connection member 1 in itself would not be further lifted up, and thus such an intermediate or half-finished operation that could lead to the damage onto the inner wall of the beverage delivering port 5d can be eliminated.

[Second Embodiment]

Figure 7:
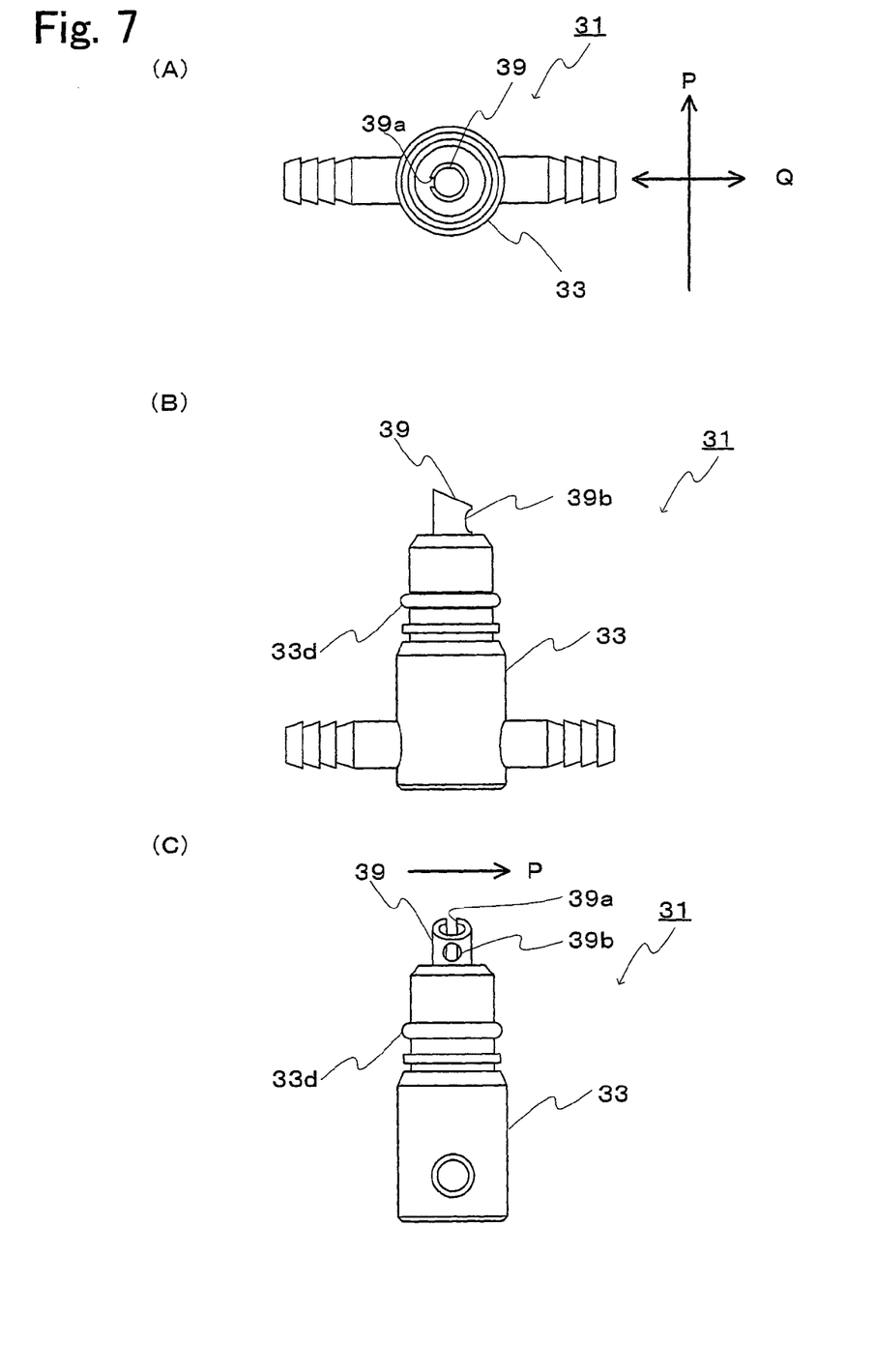

Referring now to FIG. 7, a connection member 31 used in a second embodiment of the present invention will be described. The connection member 31 according to the illustrated embodiment is similar to that in the first embodiment except the specific structure of a sharp tip portion 39. Accordingly, the description is only directed to the sharp tip portion 39, but any description on the rest of the configuration should be herein omitted. The sharp tip portion 39 of the present embodiment is different from that of the first embodiment in that it has the longest part disposed in the left sidewall side and the shortest part disposed in the right sidewall side. With this configuration, a slit 39a is formed in the longest part side and a through-hole 39b is formed in the shortest part side. Consequently, the shortest part side including the through-hole 39b can be seen in FIG. 7(C) presenting a right side elevational view of the connection member 31. The connection member 31 having the configuration as designated above can operate similarly to the first embodiment, as a tip end of the sharp tip portion 39 has an inclined surface extending along the push-in direction P for a beverage container.

[Third Embodiment]

Figure 8:
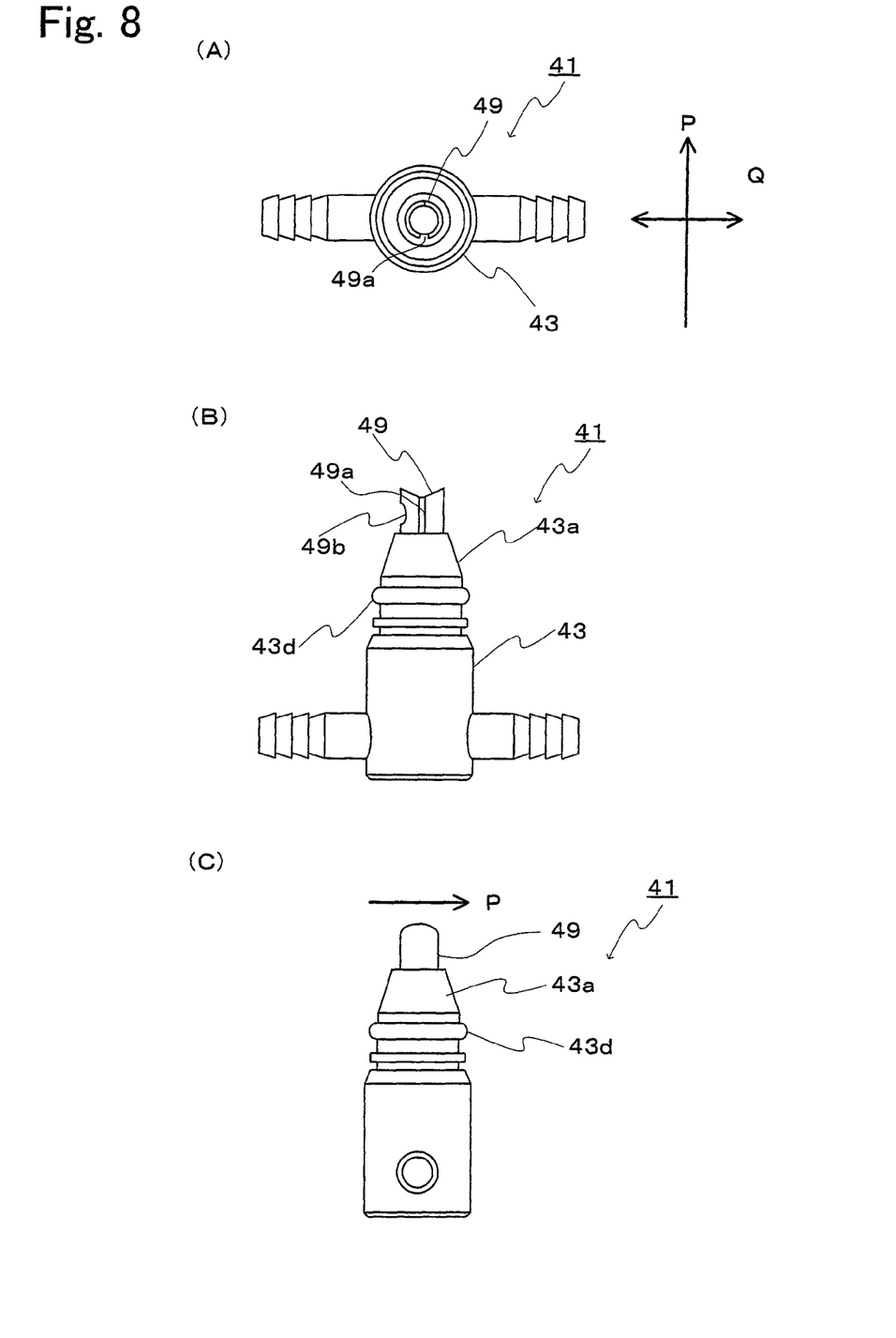

Referring now to FIG. 8, a connection member 41 used in a third embodiment of the present invention will be described. The connection member 41 according to the illustrated embodiment is similar to that in the first embodiment except the specific structure of a sharp tip portion 49 and an insert segment 43a, respectively. Accordingly, the description is only directed to the sharp tip portion 49 and the insert segment 43a, but any description on the rest of the configuration should be herein omitted. The sharp tip portion 49 of the present embodiment is different from that in the first embodiment in that it has the longest parts disposed in both of the left and the right sidewall sides and the shortest parts disposed in the front and the back surface sides. Specifically, the sharp tip portion is most proximal to the beverage container at both of the left and the right sidewall sides disposed on a line orthogonal to the push-in direction P for the beverage container 5, and resultantly a tip end of the sharp tip portion 49 defines a V-shape inclined surface as viewed from the front (see FIG. 8(B)). In addition, the slit 49a is formed in the front side, while the though-hole 49b is formed in the left sidewall side. As it is, the connection member 49 can operate similarly to the first embodiment, as the tip end of the sharp tip portion 49 has the inclined surface extending along the push-in direction P for the beverage container, as shown in FIG. 8(C) presenting a right side elevational view of the connection member 41.

In addition, the connection member 41 of the present embodiment has a truncated cone configuration with the tapered insert segment 43a. With the aid of the truncated cone configuration of the insert segment 43a, even if the beverage delivering member of the beverage container is dislocated relative to the position of the connection member 41, the perimeter of the beverage delivering port still can come into abutment with the tapered surface of the truncated cone. Thus, the beverage delivering member can be guided into the proper position as a result of the rising of the connection member 41. Finally, an O-ring 43 fitted around the connection member 41 is placed into the tubular member of the beverage delivering port, and thus the proper positioning of the connection member relative to the beverage delivering member can be properly achieved.

[Fourth Embodiment]

Figure 9:
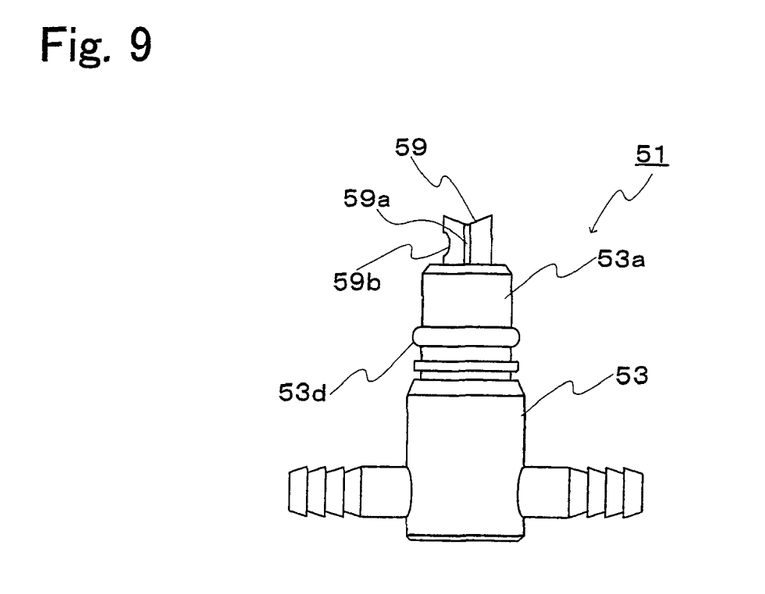
FIG. 9 shows a front view of a connection member used in a fourth embodiment of the present invention.

Referring now to FIG. 9, a connection member 51 used in a fourth embodiment of the present invention will be described. The connection member 51 according to the illustrated embodiment is substantially similar to that in the first embodiment except the specific structure of a sharp tip portion 59. In addition, the sharp tip portion 59 is similar to the sharp tip portion 49 of the third embodiment as previously described. In other words, the sharp tip portion 59 of the connection member 51 of the present embodiment has a V-shaped configuration as viewed from the front and an insert segment 53a of the connection member body 53 has a cylindrical configuration. Consequently, when a tip end of the sharp tip portion 59 comes into contact with the perimeter of the beverage delivering port, the connection member 59 would operate similarly to the third embodiment.

[Fifth Embodiment]

Figure 10:
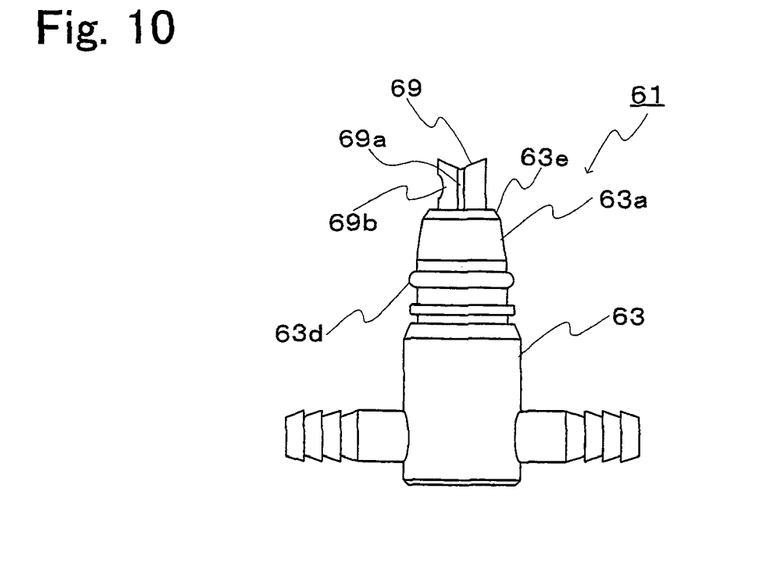
FIG. 10 shows a front view of a connection member used in a fifth embodiment of the present invention.

Referring now to FIG. 10, a connection member 61 used in a fifth embodiment of the present invention will be described. The connection member 61 according to the illustrated embodiment is substantially similar to that in the third embodiment except the specific structure of an insert segment 63*a*. In the connection member 61 according to the present embodiment, the insert segment 63*a* has a guide surface 63*e* comprising a beveled region formed at an end adjacent to the beverage delivering member and following to the above guide surface 63*e*, a truncated cone configuration at a predetermined inclination with a lower end portion defining a cylindrical portion. With the configuration as designated above, when a tip end of the sharp tip portion 69 comes into contact with the perimeter of the beverage delivering port, the connection member 61 would operate similarly to the third embodiment, and then it can guide the beverage delivering member into a proper position with the operational aid of the guide portion 63*e* and the truncated cone-shaped portion.

The present invention can be applied to a connection mechanism for connecting a beverage delivering port of a beverage container to a beverage dispenser and also to a beverage dispenser using the same connection mechanism.

The invention claimed is:

1. A connection mechanism between a beverage container and a beverage dispenser, said connection mechanism comprising:
   a container mount having a notch to be engaged with a beverage delivering port of a beverage delivering member arranged in a beverage container;
   a connection member having a cylindrical sharp tip portion at a tip end thereof to be inserted into in said beverage delivering port and configured to be connected to a piping system; and
   an operating member for inserting said connection member into said beverage delivering port, said connection mechanism characterized in that:
   an end surface of said sharp tip portion opposing to said beverage delivering port defines a guide plane operable to guide said beverage delivering member to move in its allowable moving direction within said notch, when said end surface is in contact with a perimeter edge of said beverage delivering port.

2. The connection mechanism claimed in claim 1, wherein said guide plane provides an inclined surface relative to said beverage delivering port.

3. The connection mechanism claimed in claim 1, wherein a slit is formed in a sidewall of said sharp tip portion.

4. The connection mechanism claimed in claim 1, wherein a through-hole is formed in a sidewall of said sharp tip portion.

5. The connection mechanism claimed in claim 1, wherein said connection member comprises an insert segment having said sharp tip portion carried thereon and configured to be inserted into said beverage delivering port, wherein a guide section is formed in an end portion of said insert segment adjacent to said beverage delivering port side, said guide section operable to guide said beverage delivering member to move in its allowable moving direction within said notch when said end portion is in contact with a perimeter edge of said beverage delivering port.

6. A beverage dispenser characterized in comprising said connection mechanism claimed in claim 1.

\* \* \* \* \*